(12) United States Patent
Manor

(10) Patent No.: US 9,926,036 B2
(45) Date of Patent: Mar. 27, 2018

(54) REVERSE MECHANISM FOR A MOTORCYCLE WITH A SIDECAR

(71) Applicant: Joseph Donald Manor, Yorktown, IN (US)

(72) Inventor: Joseph Donald Manor, Yorktown, IN (US)

( * ) Notice: Subject to any disclaimer, the term of this patent is extended or adjusted under 35 U.S.C. 154(b) by 369 days.

(21) Appl. No.: 14/524,017

(22) Filed: Oct. 27, 2014

(65) Prior Publication Data

US 2016/0114856 A1    Apr. 28, 2016

Related U.S. Application Data

(60) Provisional application No. 61/938,735, filed on Feb. 12, 2014.

(51) Int. Cl.
| | | |
|---|---|---|
| *B62K 27/10* | (2006.01) | |
| *B62M 29/00* | (2006.01) | |
| *B62M 23/02* | (2010.01) | |

(52) U.S. Cl.
CPC ............ *B62K 27/10* (2013.01); *B62M 29/00* (2013.01); *B62K 2710/02* (2013.01); *B62M 23/02* (2013.01)

(58) Field of Classification Search
CPC ........ B62K 27/00; B62K 27/02; B62K 27/06; B62K 27/10; B62K 2710/02; B62K 2710/10; B62K 2710/12; B62M 29/00
See application file for complete search history.

(56) References Cited

U.S. PATENT DOCUMENTS

| | | | | |
|---|---|---|---|---|
| 1,099,851 A | * | 6/1914 | Irving A ................ | B62K 27/00 280/203 |
| 2,494,707 A | * | 1/1950 | Hill ....................... | B62K 27/00 280/203 |
| 2,822,879 A | * | 2/1958 | Overton ................. | B62K 27/00 180/11 |
| 4,078,815 A | * | 3/1978 | Vetter .................... | B62K 27/00 280/203 |
| 4,254,965 A | * | 3/1981 | Kobel .................... | B62K 27/02 280/203 |
| 4,385,770 A | * | 5/1983 | Mitchell ................ | B62K 5/10 280/203 |
| 4,415,056 A | | 11/1983 | Smith | |
| 4,477,097 A | * | 10/1984 | Hayes .................... | B62K 27/02 180/210 |
| 4,580,652 A | | 4/1986 | Turner et al. | |

(Continued)

FOREIGN PATENT DOCUMENTS

| | | | | |
|---|---|---|---|---|
| FR | 2893584 A1 | * | 5/2007 | ............. B62K 27/00 |
| GB | 582362 A | * | 11/1946 | ............. B62K 27/00 |

*Primary Examiner* — Joseph M Rocca
*Assistant Examiner* — Maurice L Williams
(74) *Attorney, Agent, or Firm* — Ritchison Law Offices, PC; John D Ritchison

(57) ABSTRACT

This device is a reverse mechanism for a motorcycle with a sidecar. It is related to a motorcycle conversion assembly whereby the sidecar is outfitted with a mechanism to allow the motorcycle and sidecar combination apparatus to move in a rearward direction. The device is comprised of a retractable wheel, a drive system, a control mechanism, a battery power source and a structure to removably connect the drive and wheel to both the motorcycle and sidecar.

6 Claims, 11 Drawing Sheets

(56) References Cited

U.S. PATENT DOCUMENTS

| | | | |
|---|---|---|---|
| 5,033,762 A * | 7/1991 | Rakowski | B62K 27/06 280/203 |
| 7,290,628 B2 | 11/2007 | Kirkpatrick et al. | |
| 7,610,979 B1 | 3/2009 | Dykowski et al. | |
| 7,918,300 B2 | 4/2011 | Barns | |
| 7,997,361 B1 | 8/2011 | Bell et al. | |
| 9,339,428 B2 * | 5/2016 | Day, Jr. | A61G 3/061 |

* cited by examiner

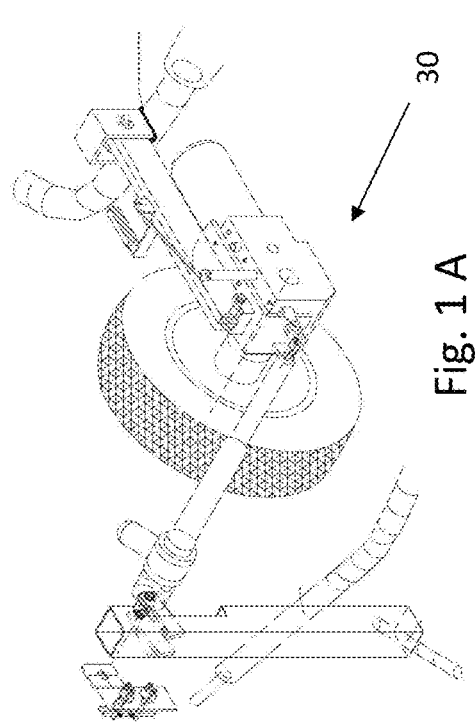
Fig. 1A
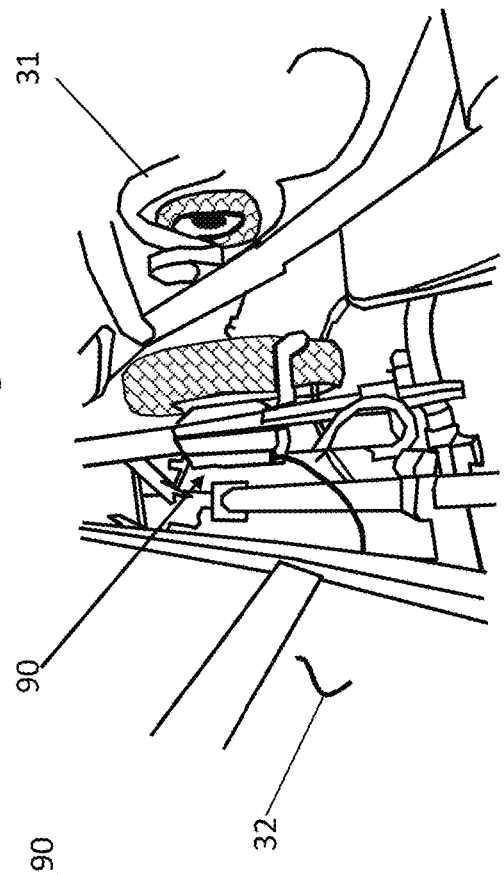
Fig. 1D
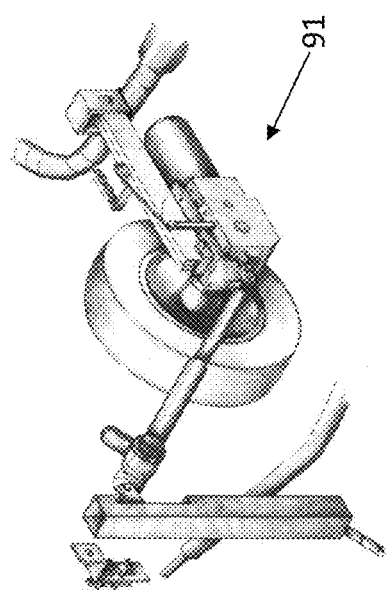
Fig. 1B
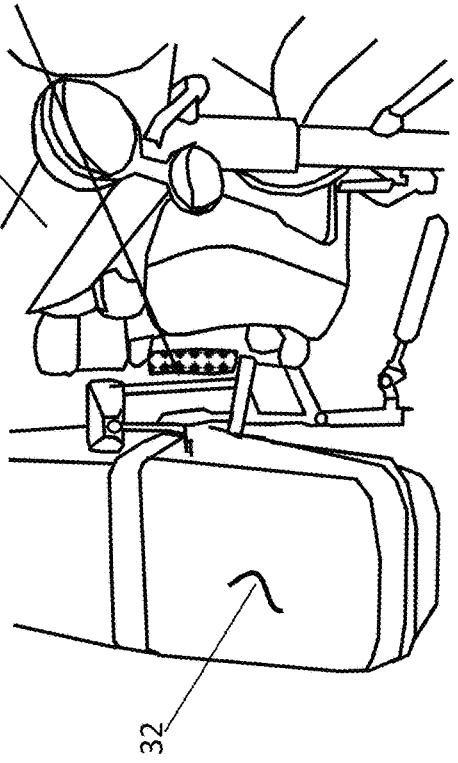
Fig. 1C
Figs. 1

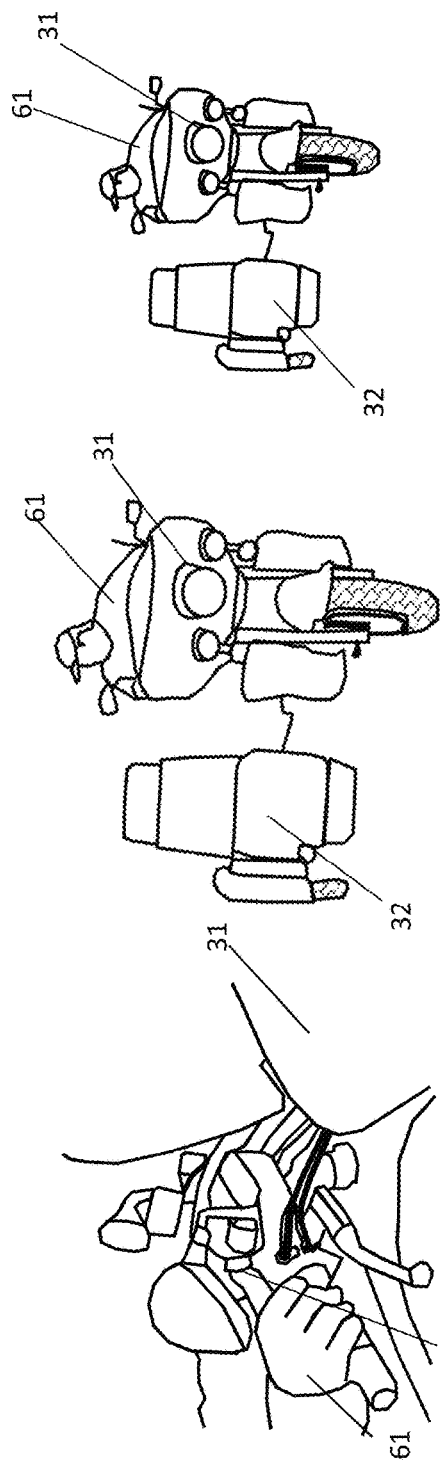
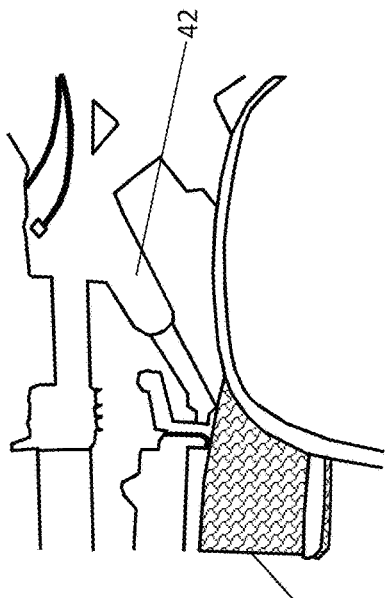
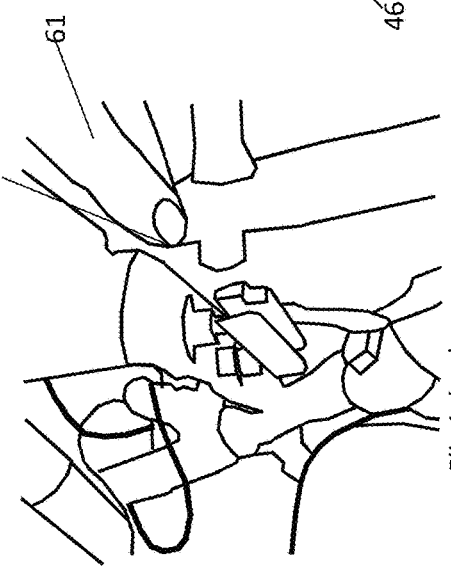
Figs. 10

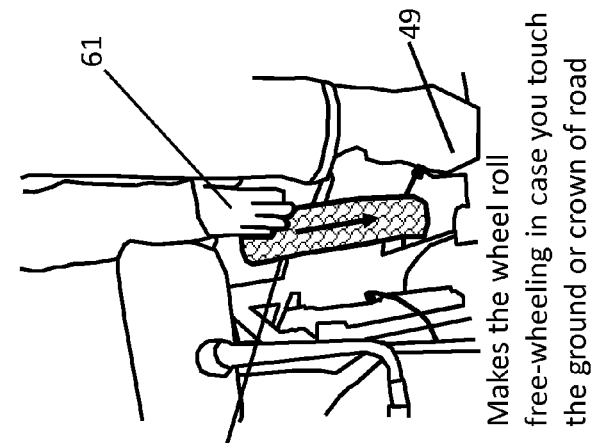
Fig. 11 C
Makes the wheel roll free-wheeling in case you touch the ground or crown of road
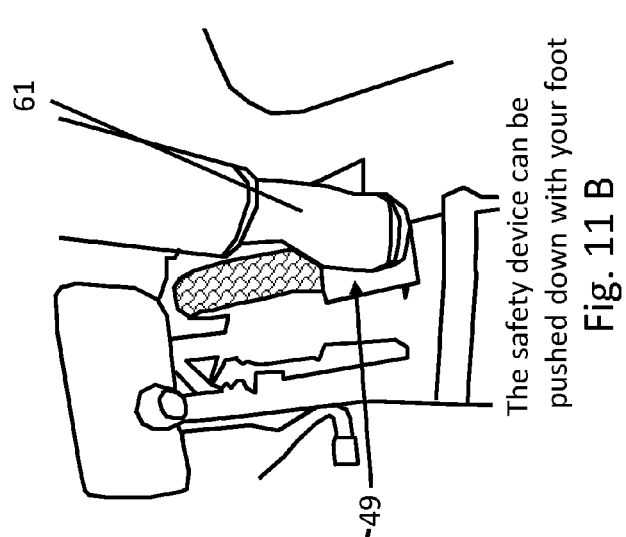
Fig. 11 B
The safety device can be pushed down with your foot
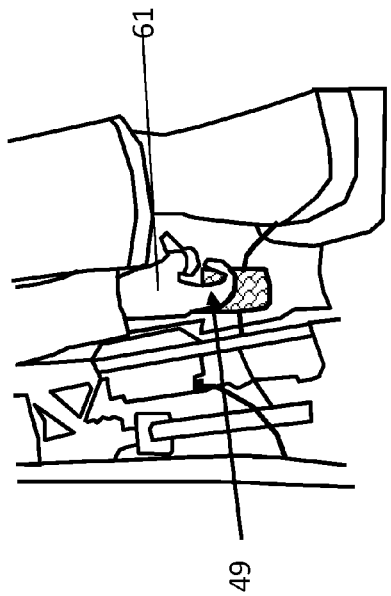
Fig. 11 E
Then pull the safety lever device up and the actuator and wheel re-engage ready for use
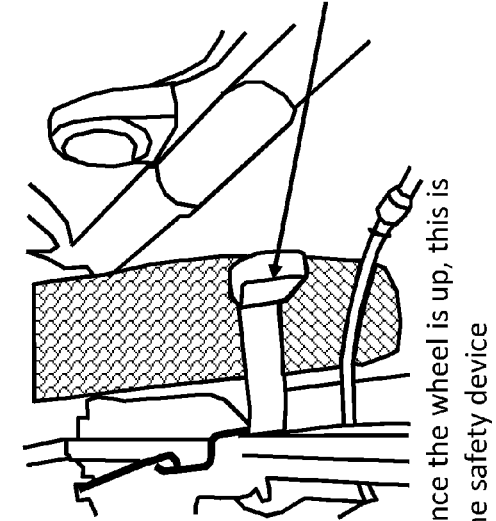
Fig. 11 A
Once the wheel is up, this is the safety device
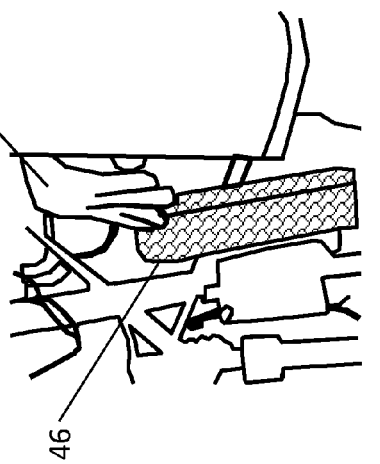
Fig. 11 D
Free tire skips right across
Figs. 11

REVERSE MECHANISM FOR A MOTORCYCLE WITH A SIDECAR

CROSS-REFERENCE TO RELATED APPLICATIONS

This application claims the benefit of U.S. Provisional Patent Application with Ser. No. 61/938,735 filed Feb. 12, 2014 by Joseph Donald Manor and entitled "A reverse mechanism for a motorcycle with a sidecar.".

FIELD OF INVENTION

This invention relates to a reverse mechanism for a motorcycle with a sidecar. The present disclosure is related to a motorcycle conversion assembly whereby the sidecar is outfitted with a mechanism to allow the motorcycle and sidecar combination apparatus to move in a rearward direction. This is required to have full maneuverability. In an alternative design mode, the same device can maneuver in a forward motion as well. The reverse mechanism includes a motor that is selectively engaged with a lever so that an auxiliary wheel is driven to permit the sidecar and motorcycle to move in a reverse direction (or alternatively in both directions). The lever is an added safety that the auxiliary wheel is to be "free-wheeling" when not in use during the normal operation of the motorcycle/sidecar apparatus.

BACKGROUND OF THE DISCLOSURE

Sidecars have been a popular alternative to sole motorcycles for many years. The sidecar permits a passenger with limited mobility to ride.

Problem

However, the maneuverability of the motorcycle with a sidecar may become cumbersome and a physical challenge for persons with less strength such as an older individual, diminutive person, or a person with a physical challenge. The reverse mechanism for a motorcycle with a sidecar addresses this concern and provides a remedy to this for all to be able to maneuver a motorcycle with a sidecar.

Prior Art

As far as known, there are no reverse mechanism for a motorcycle with a sidecar devices or the like. It is believed that this product is unique in its design and technologies.

SUMMARY OF THE INVENTION

This new device/process may be simply described as a reverse mechanism for a motorcycle with a sidecar. The device is comprised of a retractable wheel, a drive system, a control mechanism, a battery power source and a structure to removably connect the drive and wheel to both the motorcycle and sidecar. The completely described preferred embodiment is a reverse mechanism for a motorcycle and a sidecar with a set (front main frame, an upper rear main frame and a lower auxiliary rear frame) of connecting frame members, the mechanism comprised of: (a). a rigid structure and means to support the drive system with a front end and a rear end, made of durable materials, to support a sub assembly, the rigid structure comprised of a front end pivot at the front frame of the motorcycle and a rear end pivot at a hydraulic system; (b). the sub assembly comprised of a motor, a gearbox, a means for freewheeling, and an auxiliary wheel assembly; (c). a means (not shown, but intuitively obvious for those skilled in motor and gearbox drive mechanisms) for mechanically interconnecting the motor, gearbox, means for freewheeling, and wheel such that when the motor revolves, the gearbox is mechanically rotated by the motor, then the gearbox rotates through the freewheeling means, and then in turn rotates the auxiliary wheel; (d). a means (not shown but intuitively obvious to those familiar and skilled in the art of motorcycle drives, for example fasteners, welding and the like—as an example and not as a limitation) for removably connecting the sub assembly to the rigid support structure; (e). a means for pivotally and removably/detachably securing the rigid structure to the front pivot; (f). a means for removably/detachably securing the front pivot to the front frame member such as a threaded "U"-bolt, bar and a pair of threaded nuts; (g). a power source for energizing the motor; (h). a group electrical conductors and connections from the power source to the motor; (i). a means to control the power source such as a solenoid and an actuator switch (button on the handlebars); (j). the hydraulic system with a front end and a rear end, the hydraulic system comprised of an extendable actuator tube, a cylinder, exterior casing, pressure source, connectors, etc.; (k). a means for removably and pivotally securing the front end of the hydraulic system to the rigid structure; (l). a means for removably and pivotally securing the rear end of the hydraulic system to the rear frame of the motor cycle, the means further comprised essentially of a removable fastener, a vertical tube with an upper and lower end, a means (pivot and pin) to pivotally connect top end of tube to hydraulic system, and a means (such as a threaded "U"-bolt, bar and a pair of threaded nuts) to securely connect the lower end of tube to lower auxiliary motorcycle frame; (m). a power source for energizing the hydraulic system; (n). a group electrical conductors and connections from the power source to the hydraulic system through a control switch; and (o). the control switch (toggle) to open and shut the conductors (interrupt the power) from the power source to the hydraulic system.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

OBJECTS AND ADVANTAGES

There are several objects and advantages of the reverse mechanism for a motorcycle with a sidecar. There are currently no known reverse systems outside of a more expensive direct transmission installed device that are effective at providing the objects of this invention. The advantages and benefits are shown as:

| Advantages and Benefits | |
|---|---|
| Item | Advantages |
| 1 | Easier to move motorcycle with a side car |
| 2 | An less expensive alternative to full transmission option |
| 3 | Safer for physically challenged cyclists |
| 4 | Relatively easy to install with simple tools |
| 5 | Universal across various types of sidecars |

Finally, other advantages and additional features of the present reverse mechanism for a motorcycle with a sidecar device will be more apparent from the accompanying drawings and from the full description of the device. For one skilled in the art of motorcycle and sidecar devices and the like, it is readily understood that the features shown in the examples with this product are readily adapted to other types of motorcycle, scooter, ATV and ground transport on surface systems and devices.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

DESCRIPTION OF THE DRAWINGS—FIGURES

The accompanying drawings, which are incorporated in and constitute a part of this specification, illustrate an embodiment of the device that is preferred. The drawings together with the summary description given above and a detailed description given below serve to explain the principles of the reverse mechanism for a motorcycle with a sidecar device. It is understood, however, that a reverse mechanism for a motorcycle with a sidecar device is not limited to only the precise arrangements and instrumentalities shown.

FIGS. 1 A through 1 D are sketches of the general reverse mechanism for a motorcycle with a sidecar to assist and make the assembly go backwards.

Figure 8:
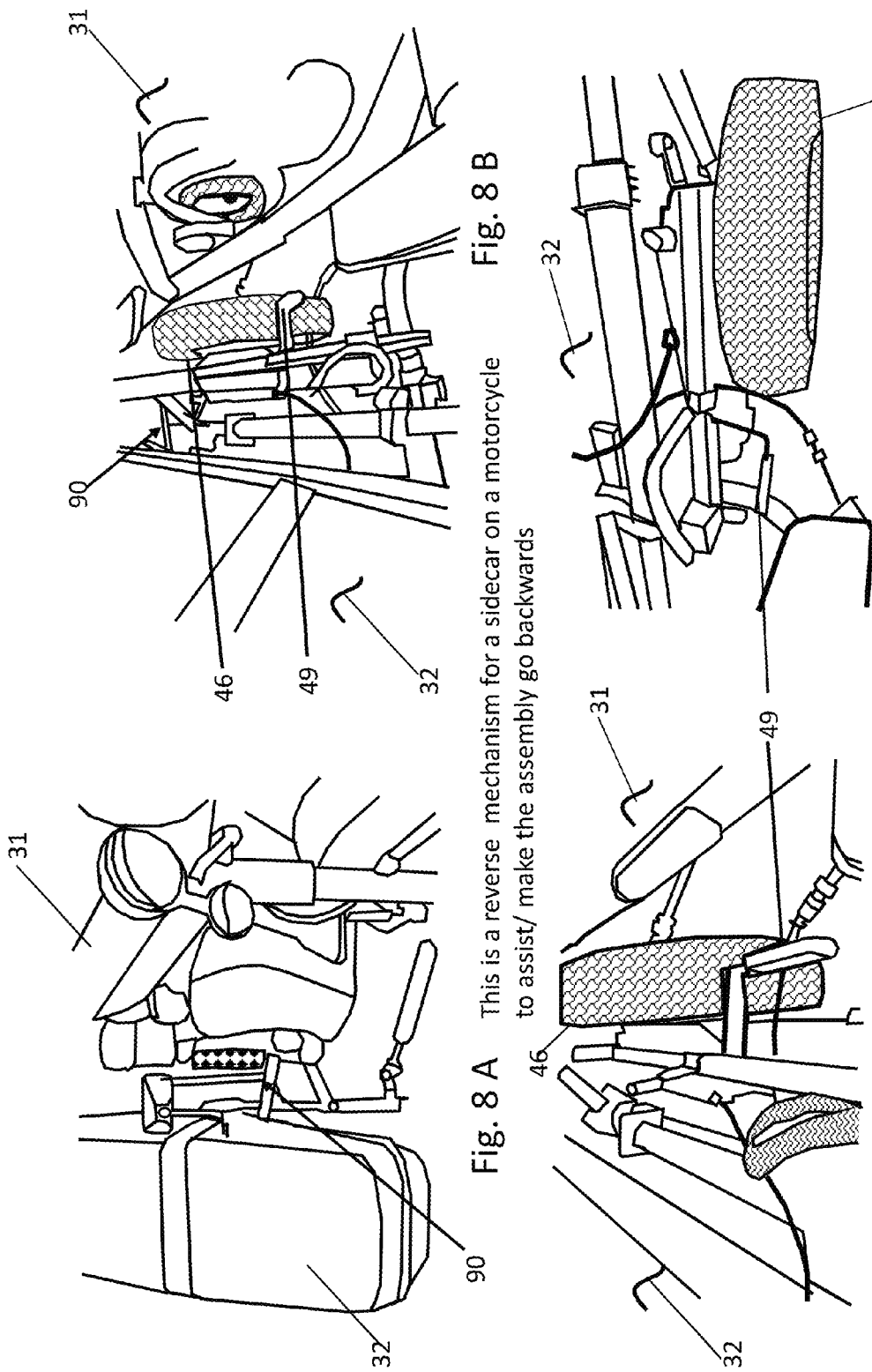

FIGS. 8 A through 8 are sketches of the open action of the side car and motorcycle reverse assist mechanism.

Figure 9:
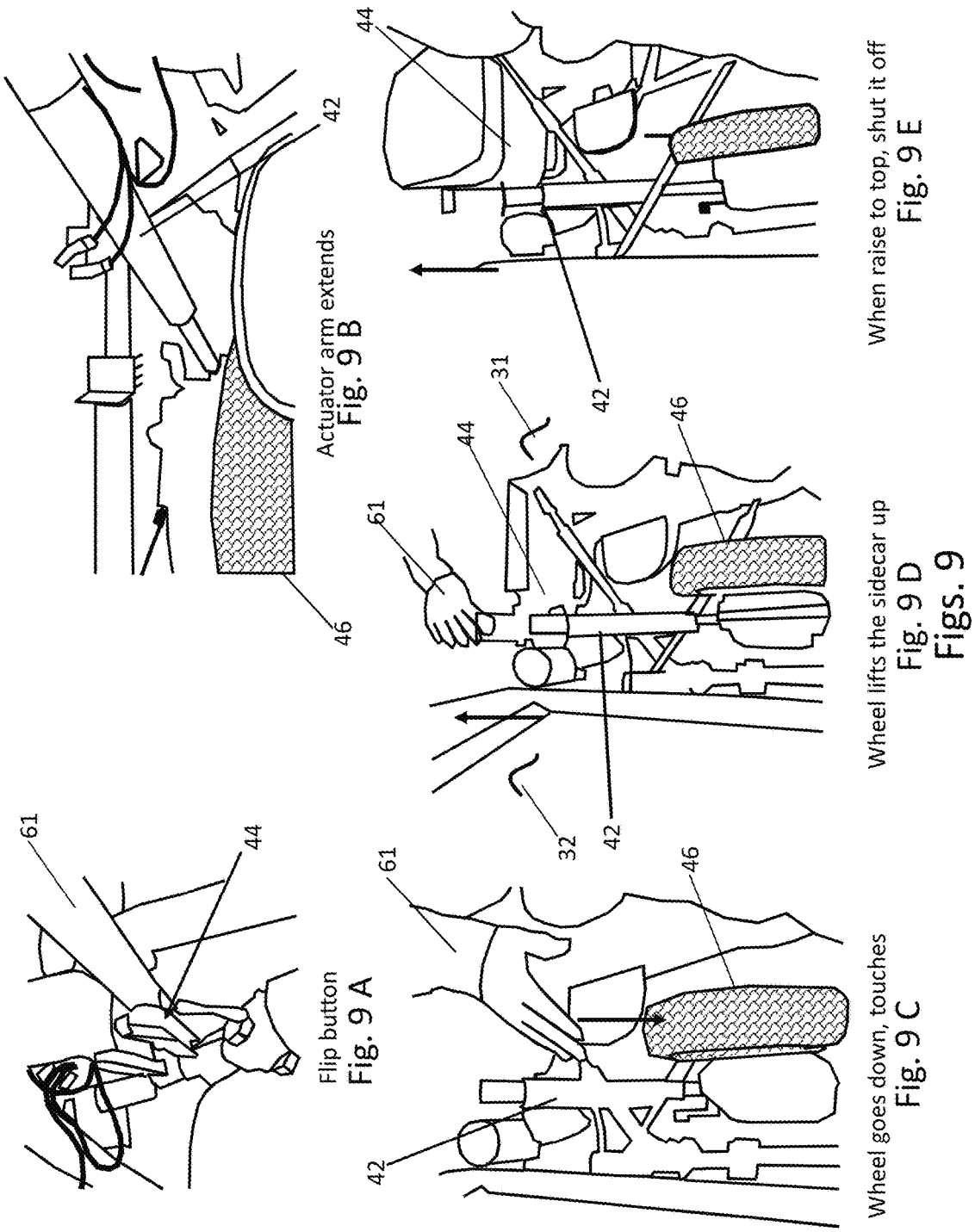

FIGS. 9 A through 9 E are more sketches of the open action of the side car and motorcycle reverse assist mechanism.

FIGS. 10 A through 10 E are additional sketches of the open action of the side car and motorcycle reverse assist mechanism.

FIGS. 11 A through 11 E are final sketches of the open action of the side car and motorcycle reverse assist mechanism.

DESCRIPTION OF THE DRAWINGS—REFERENCE NUMERALS

The following list refers to the drawings:

TABLE B

| | Reference numbers |
|---|---|
| Ref # | Description |
| 30 | reverse mechanism for a motorcycle with a sidecar to assist and make\the assembly go backwards (or both) |
| 31 | motorcycle |
| 32 | sidecar |
| 33 | Means for (removably} attaching a front pivot structure 51 front main frame 36 (such as a threaded "U"-bolt, bar and a pair of threaded nuts) |
| 34 | motorcycle rear main frame (upper) |
| 35 | motorcycle rear auxiliary frame (lower) |
| 36 | motorcycle front main frame |
| 37 | essentially vertical support structure - tube (square, round, oval), bar, or equal |
| 38 | means for (removably} attaching tube 37 to rear support 34 (such as a threaded "U"-bolt, bar and a pair of threaded nuts) |
| 39 | means for (removably} attaching tube 37 to auxiliary rear support 35 (such as a threaded "U"-bolt, bar and a pair of threaded nuts) |
| 40 | hydraulic system with a front end at the actuator bar 45 and a rear end at the vertical support 37 |
| 42 | hydraulic actuator tube |
| 43 | housing for switch 44 with means for connecting 46A housing 45 to tube 37 |
| 44 | toggle switch to reverse battery polarity - actuator extension button (at tube structure 37) |
| 45 | actuator bar/arm/means to support the motor/gear motor etc. |
| 46 | drive wheel |
| 47 | means for removably attaching wheel 46 to drive motor 60 |
| 49 | neutral free wheel lever - Safety lever to make free wheeling |
| 50 | pivot structure at actuator arm 42 and motor 60 |
| 50A | removable fastener/pin/threaded/cotter pin/etc. |
| 51 | pivot structure at actuator arm and front motorcycle frame |
| 52 | pivot structure at actuator bar 45 and motor 60 |
| 53 | pivot structure at actuator system 40 and vertical tube 37 |
| 54 | means for removably connecting actuator arm 45 to front pivot structure 51 |
| 55 | means for removably connecting hydraulic system 40 to rear pivot structure 53 |
| 55A | removable fastener/pin/threaded/cotter pin/etc. |
| 56 | means for (removably} attaching tube 37 to pivot support 53 |
| 60 | drive motor for wheel |
| 60A | gearbox/brake |
| 61 | operator/driver of motorcycle |
| 66 | Sub assembly - motor 60, gearbox and brake 60A, freewheeling system 49 and wheel 46 |
| 70 | motorcycle battery |
| 71 | negative terminal of motorcycle battery |
| 72 | positive terminal of motorcycle battery |
| 73 | Fuse (amp approx. 15) |
| 74 | motorcycle battery to hydraulic system wiring |
| 80 | deep draw batteries as power source for motor 60 |
| 81 | recharge port for batteries |
| 82 | reset relay and button |
| 83 | motor starter solenoid |
| 84 | wheel power system fuses |
| 85 | ground |
| 86 | auxiliary battery to hydraulic system wiring |
| 87 | Push button on motorcycle 31 handle bars |
| 88 | Solenoid wiring from solenoid 83 to drive motor - gearbox/brake 60 for wheel 45 |
| 90 | prototype of reverse mechanism for a sidecar on a motorcycle to assist and make the assembly go backwards (or both) |

TABLE B-continued

Reference numbers

| Ref # | Description |
|---|---|
| 91 | artist rendering of reverse mechanism for a sidecar on a motorcycle to assist and make the assembly go backwards (or both) |

DETAILED DESCRIPTION OF PREFERRED EMBODIMENT

The present development is a reverse mechanism for a motorcycle with a sidecar. This invention relates to a reverse mechanism for a motorcycle with a sidecar. The present disclosure is related to a motorcycle conversion assembly whereby the sidecar is outfitted with a mechanism to allow the motorcycle and sidecar combination apparatus to move in a rearward direction. This is required to have full maneuverability. In an alternative design mode, the same device can maneuver in a forward motion as well. The reverse mechanism includes a motor that is selectively engage able with a lever so that an auxiliary wheel is driven to permit the sidecar and motorcycle to move in a reverse direction. The lever is an added safety that the auxiliary wheel is to be "free-wheeling" when not in use during the normal operation of the motorcycle/sidecar apparatus.

There is shown in FIGS. 1-11 a description and operative embodiment of a reverse mechanism for a motorcycle with a sidecar device. In the drawings and illustrations, one notes well that the FIGS. 1 through 7 demonstrate the general configuration, and FIGS. 8-11 show the operation of a reverse mechanism for a motorcycle with a sidecar device. The various example uses are in the operation and use section, below.

The accompanying drawings, which are incorporated in and constitute a part of this specification, illustrate an embodiment of a reverse mechanism for a motorcycle with a sidecar device 30 that is preferred. The drawings together with the summary description given above and a detailed description given below serve to explain the principles of the reverse mechanism for a motorcycle with a sidecar 30.

The advantages and benefits of the device 30 are:
Easier to move motorcycle with a side car
An less expensive alternative to full transmission option
Safer for physically challenged cyclists
Relatively easy to install with simple tools
Universal across various types of sidecars The device is comprised of a retractable wheel, a drive system, a control mechanism, a battery power source and a structure to removably connect the drive and wheel to both the motorcycle and sidecar. The completely described preferred embodiment is a reverse mechanism 30 for a motorcycle 31 and a sidecar 32 with a set (front main frame 36, an upper rear main frame 34 and a lower auxiliary rear frame 35) of connecting frame members, the mechanism comprised of: (a). a rigid structure and means to support 45 the drive system with a front end and a rear end, made of durable materials, to support a sub assembly, the rigid structure 45 comprised of a front end pivot 51 at the front frame 36 of the motorcycle 31 and a rear end pivot 52 at a hydraulic system 40; (b). the sub assembly comprised of a motor 60, a gearbox 60A, a means for freewheeling 49, and an auxiliary wheel assembly 46; (c). a means (not shown, but intuitively obvious for those skilled in motor and gearbox drive mechanisms) for mechanically interconnecting the motor 60, gearbox 60A, means 49 for freewheeling, and wheel 46 such that when the motor 60 revolves, the gearbox 60A is mechanically rotated by the motor 60, then the gearbox 60A rotates through the freewheeling means 49, and then in turn rotates the auxiliary wheel 46; (d). a means (not shown but intuitive obvious to those familiar and skilled in the art of motorcycle drives, for example fasteners, welding and the like—as an example and not as a limitation) for removably connecting the sub assembly to the rigid support structure; (e). a means 54 for pivotally and removably/detachably securing the rigid structure 45 to the front pivot 51; (f). a means 33 for removably/detachably securing the front pivot 55 to the front frame member 36 such as a threaded "U"-bolt, bar and a pair of threaded nuts; (g). a power source 80 for energizing the motor 60; (h). a group 86 electrical conductors and connections from the power source 80 to the motor 60; (i). a means 83 to control the power source 80 such as a solenoid 83 and an actuator switch 87 (button on the handlebars); (j). the hydraulic system 40 with a front end and a rear end, the hydraulic system 40 comprised of an extendable actuator tube 42, a cylinder, exterior casing, pressure source, connectors, etc.; (k). a means 50 for removably and pivotally securing the front end of the hydraulic system 40 to the rigid structure 45; (l). a means 55 for removably and pivotally securing the rear end of the hydraulic system 40 to the rear frame 34, 35 of the motor cycle 31, the means further comprised essentially of a removable fastener 55A, a vertical tube 37 with an upper and lower end, a means (pivot 53 and fastener/pin 55A) to pivotally connect top end of tube 37 to hydraulic system 40, and a means 39 (such as a threaded "U"-bolt, bar and a pair of threaded nuts) to securely and detachably connect the lower end of tube 37 to lower auxiliary motorcycle frame 35; (m). a power source 70 for energizing the hydraulic system 40; (n). a group electrical conductors and connections 74A, 74B, 74C, and 74D from the power source 70 to the hydraulic system 40 through a control switch 44; and (o). the control switch 44 (toggle) to open and shut the conductors 74A and 74C (interrupt the power) from the power source 70 to the hydraulic system 40.

FIGS. 1A through 1D are sketches of the general reverse mechanism for a motorcycle with a sidecar to assist and make the assembly go backwards. In FIG. 1A is shown the reverse mechanism 30 for a motorcycle 31 with a sidecar 32 to assist and make the assembly go backwards (or as an alternative forward or both). In FIG. 1B is an artist rendering 91 of reverse mechanism 30 for a sidecar 32 on a motorcycle 31 to assist and make the assembly go backwards (or as an alternative forward or both). FIG. 1C shows a Motorcycle 31 and Sidecar 32 with a prototype 90 of reverse mechanism for a sidecar on a motorcycle to assist and make the assembly go backwards (or as an alternative forward or both). In FIG. 1D a close up of the Motorcycle 31, Sidecar 32, and Prototype 90 of reverse mechanism for a sidecar on a motorcycle to assist and make the assembly go backwards (or as an alternative forward or both).

Figure 2:
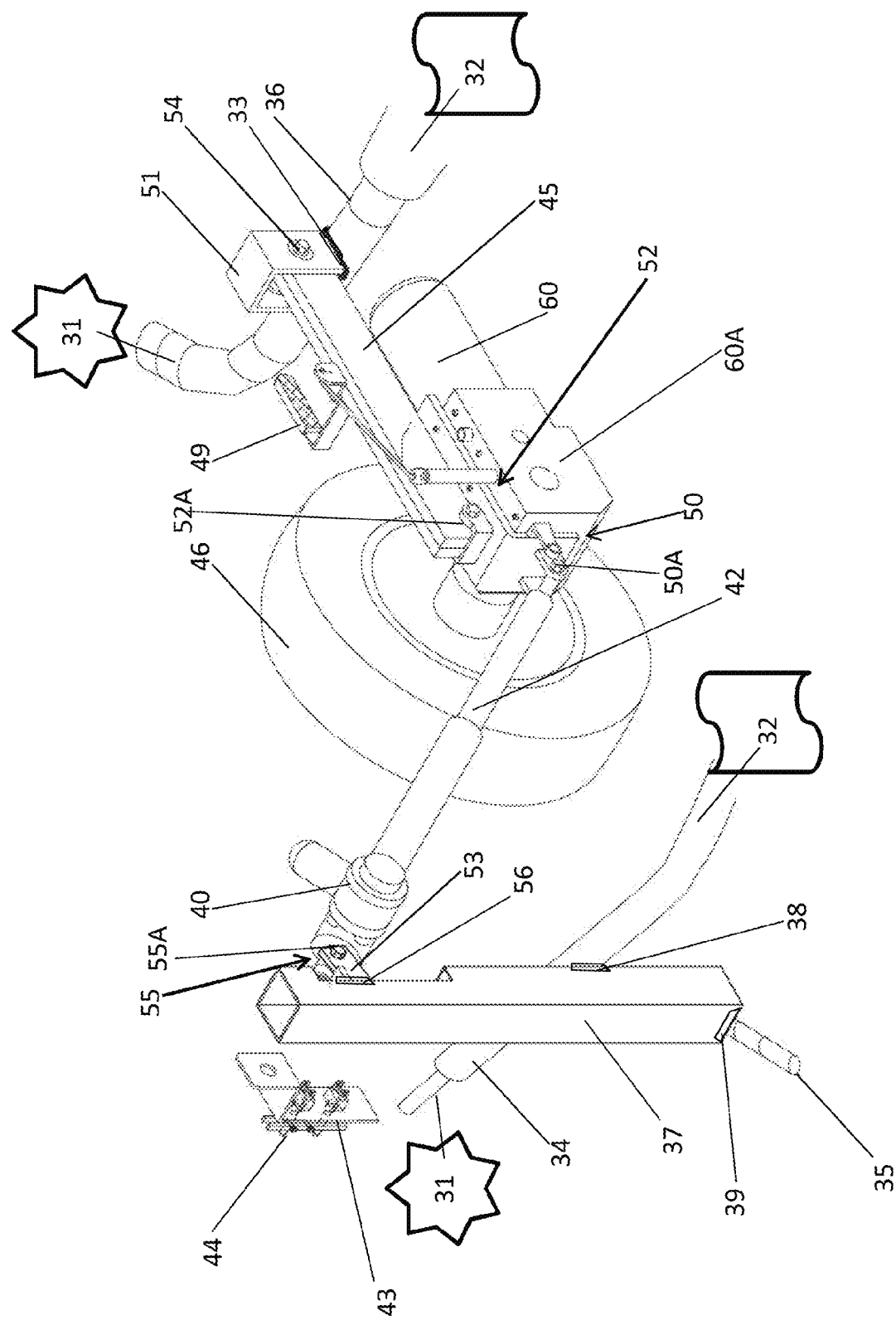
FIG. 2 is a sketch of the general reverse mechanism for motorcycles with sidecar components and features noted.

FIG. 2 is a sketch of the general reverse mechanism 30 for motorcycles 31 with sidecar 32 components and features noted. In this figure is shown the motorcycle 31, sidecar 32, means 33 for (removable such as U clip and pin, bolt and nut or cotter pin and key) attaching a front pivot structure 51, the front main frame 36, the motorcycle rear main frame (upper) 34, a motorcycle rear auxiliary frame (lower) 35, a motorcycle front main frame 36, an essentially vertical support structure 37 such as tube (square, round, oval), bar, or equal, a means 38 for (removable such as U clip and pin, bolt and nut or cotter pin and key) attaching tube 37 to rear support 34, a means 39 for (removable such as U clip and pin, bolt and nut or cotter pin and key) attaching tube 37 to auxiliary rear support 35, a hydraulic system 40 with a front end at the actuator bar 45 and a rear end at the vertical support 37, hydraulic actuator tube 42, a housing 43 for switch 44 with means for connecting 46A housing 45 to tube 37, a toggle switch 44 to reverse battery polarity—actuator extension button (at tube structure 37); an actuator bar/arm 45, a drive wheel 46, a means 47 for removably attaching wheel 46 to drive motor 60, a neutral free wheel lever 49 e.g. a safety lever to make free-wheeling, a pivot structure 50 at actuator arm 42 and motor 60, a pivot structure 51 at actuator arm 45 and front motorcycle frame 36, a pivot structure 52 at actuator bar/arm 45 and motor 60 pivot structure 53 at actuator/hydraulic system 40 and a vertical structure 37, a means 54 (such as bolt and nut, cotter pin and key, etc.) for removably connecting actuator arm 45 to front pivot structure 51, a means 55 (such as bolt and nut, cotter pin and key, etc.) for removably connecting hydraulic system 40 to rear pivot structure 53, a means 56 for (removable such as U clip and pin, bolt and nut or cotter pin and key) attaching tube 37 to pivot support 53, the sub assembly 66 drive motor 60 and gearbox/brake 60A for wheel 45. As one skilled in the art of motorcycle and sidecar devices will appreciate, these embodiments may be as an original installation or retrofitted in the field.

Figure 3:
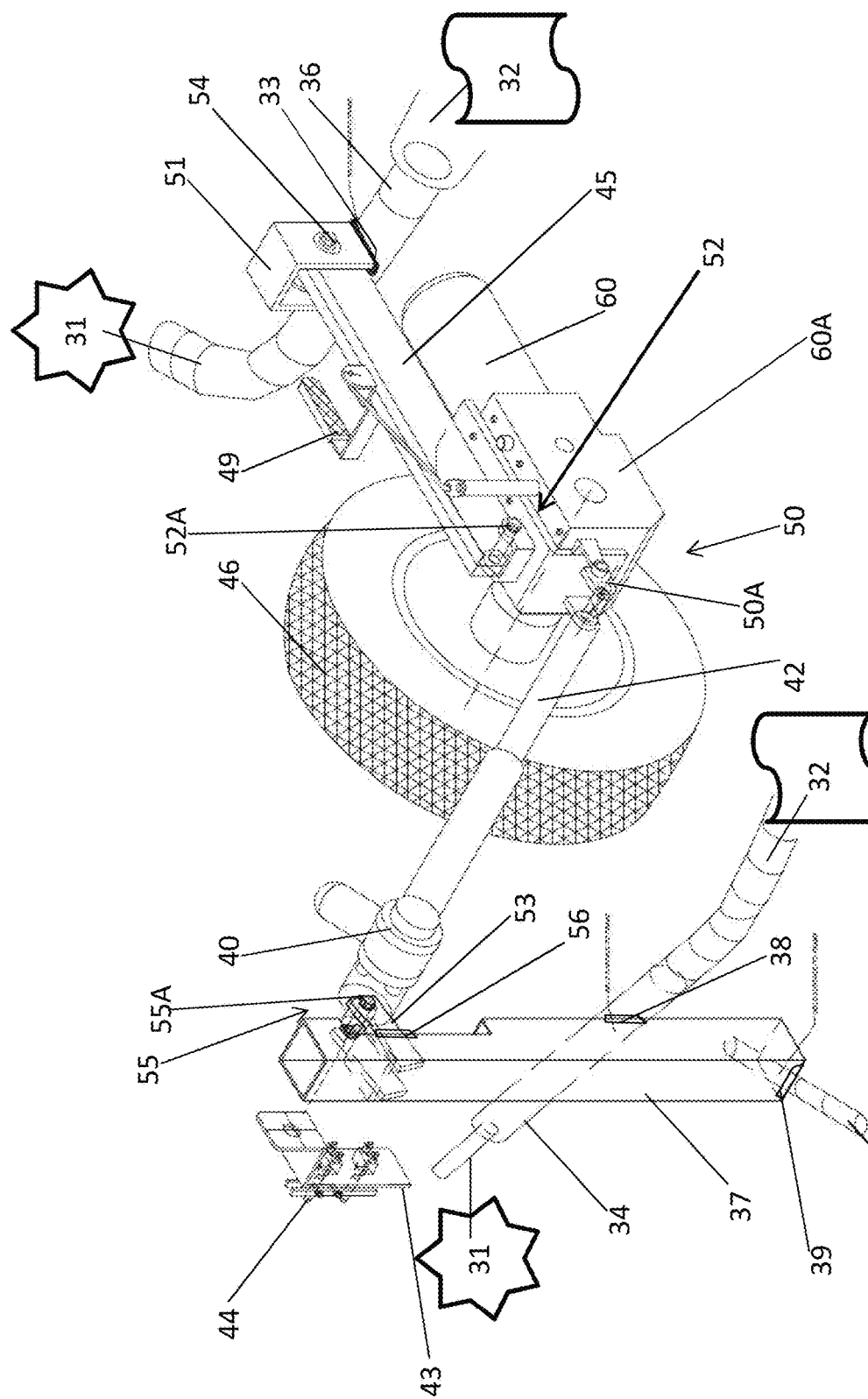
FIG. 3 is another detailed sketch of a reverse for mechanism for motorcycles with sidecars with the components and features shown from generally a isometric view.

FIG. 3 is another detailed sketch of a reverse for mechanism for motorcycles with sidecars with the components and features shown from generally a isometric view. Again is shown the motorcycle 31, sidecar 32, means 33 for (removable such as U clip and pin, bolt and nut or cotter pin and key) attaching a front pivot structure 51 front main frame 36, motorcycle rear main frame (upper) 34, motorcycle rear auxiliary frame (lower) 35, motorcycle front main frame 36 essentially vertical support structure 37 such as tube (square, round, oval), bar, or equal), means 38 for (removable such as U clip and pin, bolt and nut or cotter pin and key) attaching tube 37 to rear support 34, means 39 for (removable such as U clip and pin, bolt and nut or cotter pin and key) attaching tube 37 to auxiliary rear support 35, hydraulic system 40 with a front end at the actuator bar 45 and a rear end at the vertical support 37, hydraulic actuator tube 42 housing 43 for switch 44 with means for connecting 46A housing 45 to tube 37, toggle switch 44 to reverse battery polarity—actuator extension button (at tube structure 37), actuator bar/arm 45, drive wheel 46, means 47 for removably attaching wheel 46 to drive motor 60, neutral free wheel lever 49 e.g. a safety lever to make free wheeling, pivot structure 50 at actuator arm 42 and motor 60, pivot structure 51 at actuator arm 45 and front motorcycle frame 36, pivot structure 52 at actuator bar/arm 45 and motor 60, pivot structure 53 at actuator system 40 and vertical structure 37, means 54 (such as bolt and nut, cotter pin and key, etc.) for removably connecting actuator arm 45 to front pivot structure 51, a means 55 (such as bolt and nut, cotter pin and key, etc.) for removably connecting hydraulic system 40 to rear pivot structure 53, and a means 56 for (removable such as U clip and pin, bolt and nut or cotter pin and key) attaching tube 37 to pivot support 53, drive motor 60, a gearbox/brake 60A for wheel 46.

The configurations are discussed throughout. The reverse mechanism 30 for a motorcycle 31 and a sidecar 32 are comprised of durable materials. One must quickly realize the configuration of the tubes may be of various tubular configurations. For example and not as a limitation the tube may be as a circular or round tube, ovular/elliptical tube, square, rectangular or other polygon-type tube shapes. The components may be comprised of a metal such as steel or aluminum and may be coated with a powder coat, paint, or other surface finish. The preferred material and embodiment of structure is made of a metal or heavy duty, durable plastic or composite material. The plastic may be of various types of durable simple resins or reinforced plastic and are a suitable use for re-ground and recycled plastics to permit the product to be considered a "GREEN" product environmentally.

Figure 4:
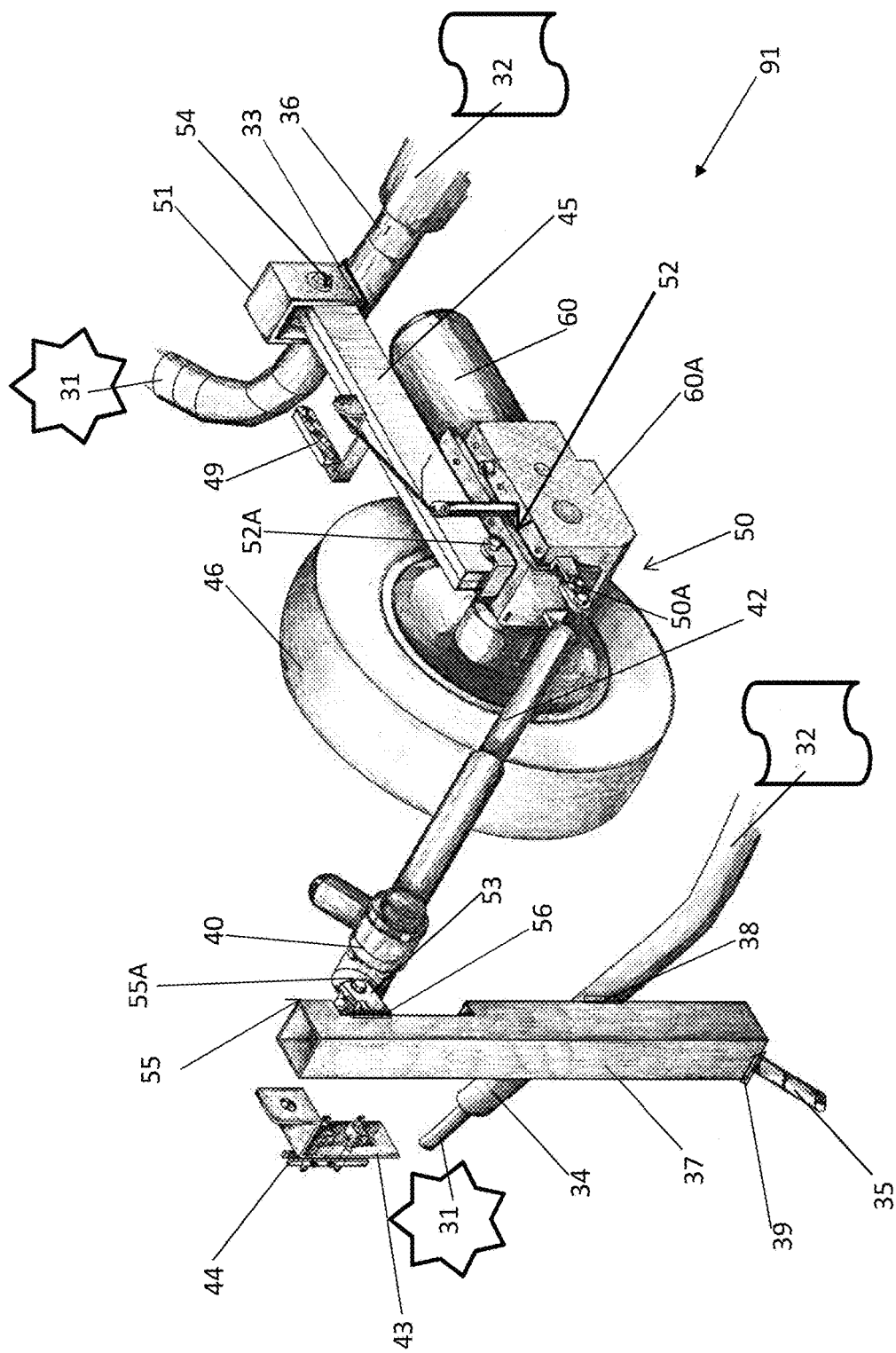
FIG. 4 is an artist rendering of the side car reverse mechanism with components and details noted.

FIG. 4 is an artist rendering 91 of reverse mechanism for a sidecar on a motorcycle to assist and make the assembly go backwards (or as an alternative forward or both). Shown are the motorcycle 31, sidecar 32, means 33 for (removable such as U clip and pin, bolt and nut or cotter pin and key) attaching a front pivot structure 51 front main frame 36, motorcycle rear main frame (upper) 34, motorcycle rear auxiliary frame (lower) 35, motorcycle front main frame 36 essentially vertical support structure 37 such as tube (square, round, oval), bar, or equal, means 38 for (removable such as U clip and pin, bolt and nut or cotter pin and key) attaching tube 37 to rear support 34, means 39 for (removable such as U clip and pin, bolt and nut or cotter pin and key) attaching tube 37 to auxiliary rear support 35, hydraulic system 40 with a front end at the actuator bar 45 and a rear end at the vertical support 37, hydraulic actuator tube 42 housing 43 for switch 44 with means for connecting 46A housing 45 to tube 37, toggle switch 44 to reverse battery polarity—actuator extension button (at tube structure 37), actuator bar/arm 45, drive wheel 46, means 47 for removably attaching wheel 46 to drive motor 60, neutral free wheel lever 49 e.g. a safety lever to make free-wheeling, pivot structure 50 at actuator arm 42 and motor 60, pivot structure 51 at actuator arm 45 and front motorcycle frame 36, pivot structure 52 at actuator bar/arm 45 and motor 60, pivot structure 53 at actuator system 40 and vertical structure 37, means 54 (such as bolt and nut, cotter pin and key, etc.) for removably connecting actuator arm 45 to front pivot structure 51, means 55 (such as bolt and nut, cotter pin and key, etc.) for removably connecting hydraulic system 40 to rear pivot structure 53, and a means 56 for (removable such as U clip and pin, bolt and nut or cotter pin and key) attaching tube 37 to pivot support 53, drive motor 60, gearbox/brake 60A for wheel 46.

Figure 5:
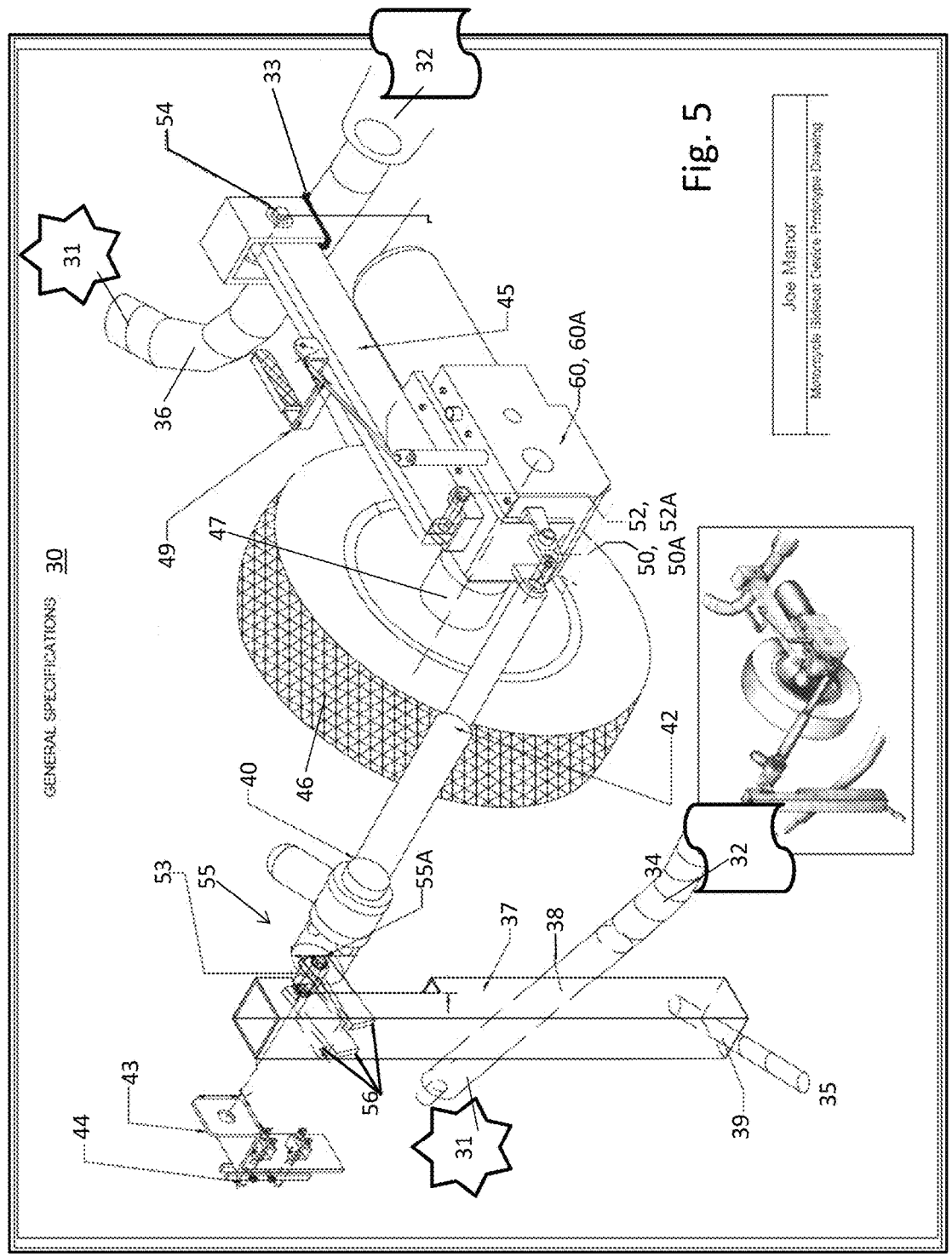
FIG. 5 is a build drawing for the side car mechanism.

FIG. 5 is a build drawing for the side car mechanism 30. Again are shown the motorcycle 31, sidecar 32, means 33 for (removable such as U clip and pin, bolt and nut or cotter pin and key) attaching a front pivot structure 51 front main frame 36, motorcycle rear main frame (upper) 34, motorcycle rear auxiliary frame (lower) 35, motorcycle front main frame 36 essentially vertical support structure 37 such as tube (square, round, oval), bar, or equal, means 38 for (removable such as U clip and pin, bolt and nut or cotter pin and key) attaching tube 37 to rear support 34, means 39 for (removable such as U clip and pin, bolt and nut or cotter pin and key) attaching tube 37 to auxiliary rear support 35, hydraulic system 40 with a front end at the actuator bar 45 and a rear end at the vertical support 37, hydraulic actuator tube 42 housing 43 for switch 44 with means for connecting 46A housing 45 to tube 37, toggle switch 44 to reverse battery polarity—actuator extension button (at tube structure 37), actuator bar/arm 45, drive wheel 46, means 47 for removably attaching wheel 46 to drive motor 60, neutral free wheel lever 49 e.g. a safety lever to make free-wheeling, pivot structure 50 at actuator arm 42 and motor 60, pivot structure 51 at actuator arm 45 and front motorcycle frame 36, pivot structure 52 at actuator bar/arm 45 and motor 60, pivot structure 53 at actuator system 40 and vertical structure 37, means 54 (such as bolt and nut, cotter pin and key, etc.) for removably connecting actuator arm 45 to front pivot structure 51, means 55 (such as bolt and nut, cotter pin and key, etc.) for removably connecting hydraulic system 40 to rear pivot structure 53, and a means 56 for (removable such as U clip and pin, bolt and nut or cotter pin and key) attaching tube 37 to pivot support 53, drive motor 60, gearbox/brake 60A for wheel 46.

Figure 6:
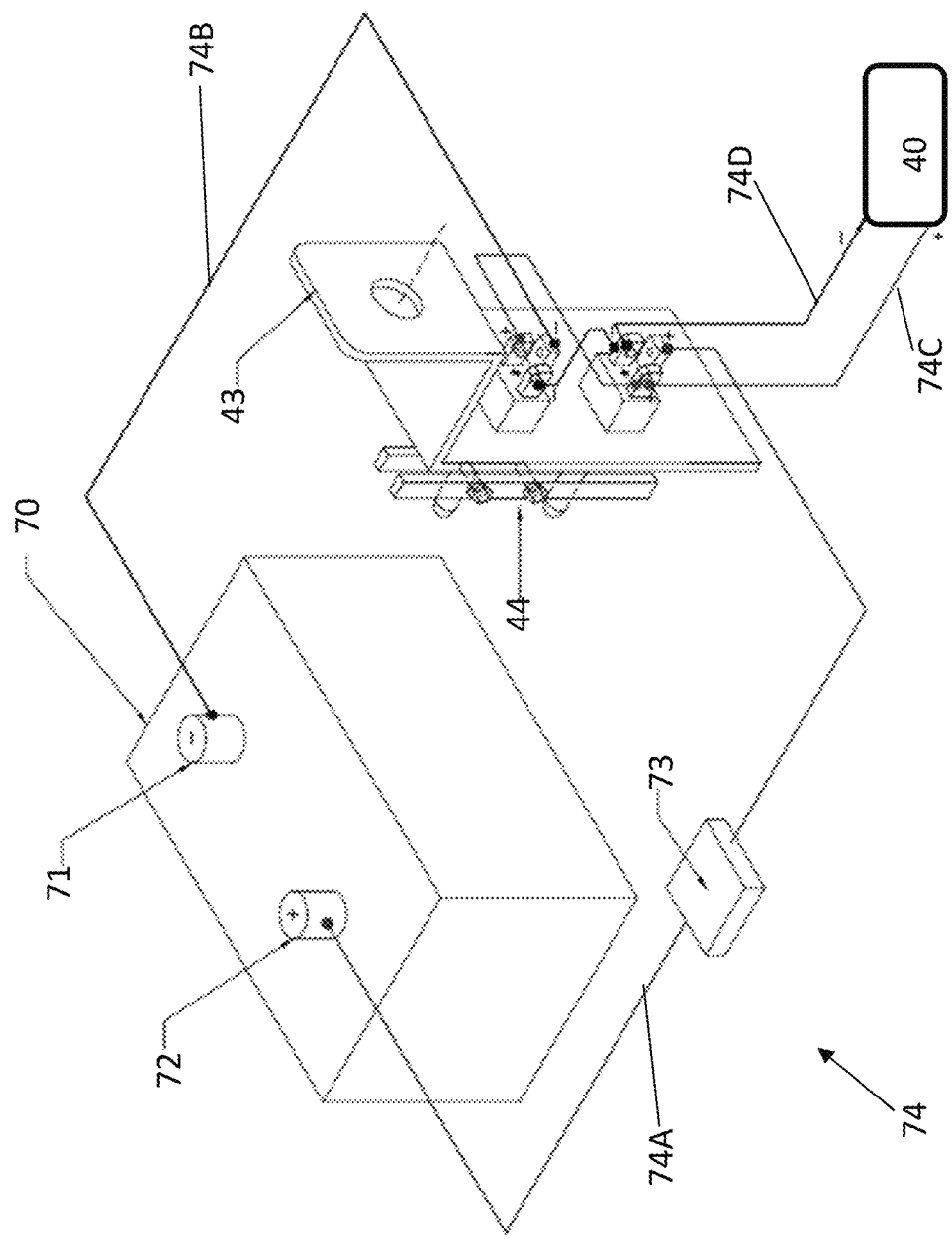
FIG. 6 is a wiring schematic for the activator hydraulic system on the sidecar reverse mechanism.

FIG. 6 is a wiring schematic for the activator hydraulic system 40 on the sidecar reverse mechanism 30. Here is shown a motorcycle battery 70 with a negative terminal 71 of motorcycle battery 70, a positive terminal 72 of motorcycle battery 70, a fuse (amp approx. 15) 73, in the wiring 74 (74A through 74D branches of the wiring) from motorcycle battery 70 to hydraulic system 40, the hydraulic system 40 (not shown), a housing 43 for switch 44 with means for connecting 46A housing 43 to tube 37, and a toggle switch 44 (or equal) to reverse battery polarity to the actuator 40.

Figure 7:
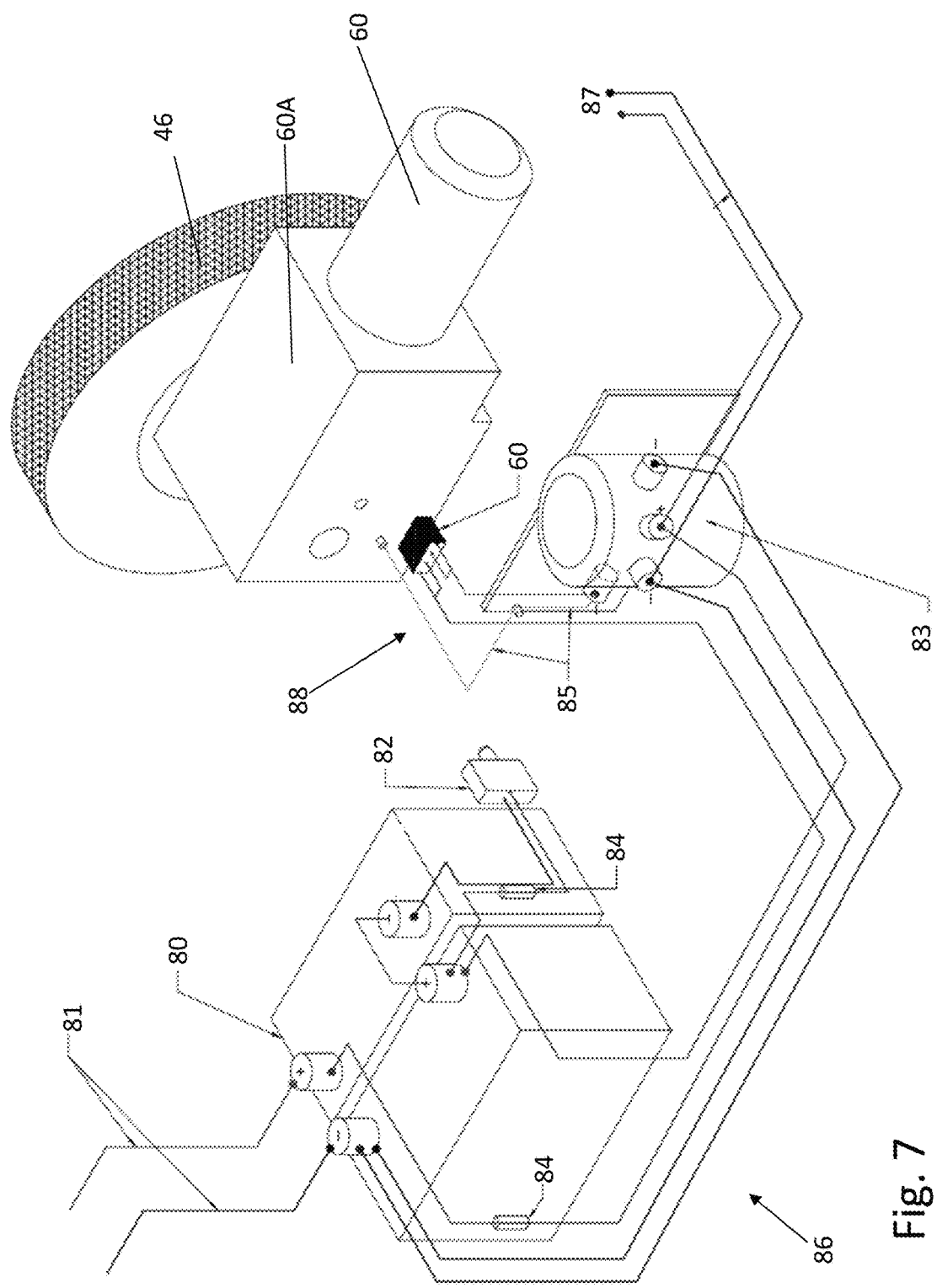
FIG. 7 is a wiring schematic for the drive wheel motor on the reverse mechanism for side cars.

FIG. 7 is a wiring schematic for the drive wheel motor 60 on the reverse mechanism 30 for side cars. Here in the schematic are shown the deep draw batteries 80 as power source for motor 60, recharge port 81 for batteries 80, reset relay and button 82, motor starter solenoid 83, wheel power system fuses 84, ground 85, wiring 86 from auxiliary deep draw battery 80 to solenoid 83, a push button 87 on motorcycle 31 handle bars, the solenoid wiring 88 from solenoid 83 to a drive motor 60 and gearbox/brake 60A for wheel 46.

FIGS. 8 A through 8 D; FIGS. 9 A through 9 E; FIGS. 10 A through 10 E; and FIGS. 11 A through 11 E are sketches of the open action of the side car and motorcycle reverse assist mechanism. These are discussed in the Operation section below.

The details mentioned here are exemplary and not limiting. Other specific components and manners specific to describing a reverse mechanism device 30 for a motorcycle with a sidecar may be added as a person having ordinary skill in the field of motorcycle, scooter, ATV and other ground/surface transportation devices and their uses well appreciates.

Operation of the Preferred Embodiment

The reverse mechanism device 30 for a motorcycle with a sidecar has been described in the above embodiment. The manner of how the device operates is described below. One notes well that the description above and the operation described here must be taken together to fully illustrate the concept of a reverse mechanism for a motorcycle with a sidecar device 30.

The preferred embodiment is a reverse mechanism 30 for a motorcycle 31 and a sidecar 32 with a set (front main frame 36, an upper rear main frame 34 and a lower auxiliary rear frame 35) of connecting frame members, the mechanism comprised of: (a). a rigid structure and means to support 45 the drive system with a front end and a rear end, made of durable materials, to support a sub assembly, the rigid structure 45 comprised of a front end pivot 51 at the front frame 36 of the motorcycle 31 and a rear end pivot 52 at a hydraulic system 40; (b). the sub assembly comprised of a motor 60, a gearbox 60A, a means for freewheeling 49, and an auxiliary wheel assembly 46; (c). a means (not shown, but intuitively obvious for those skilled in motor and gearbox drive mechanisms) for mechanically interconnecting the motor 60, gearbox 60A, means 49 for freewheeling, and wheel 46 such that when the motor 60 revolves, the gearbox 60A is mechanically rotated by the motor 60, then the gearbox 60A rotates through the freewheeling means 49, and then in turn rotates the auxiliary wheel 46; (d). a means (not shown but intuitively obvious to those familiar and skilled in the art of motorcycle drives, for example fasteners, welding and the like—as an example and not as a limitation) for removably connecting the sub assembly to the rigid support structure; (e). a means 54 for pivotally and removably/detachably securing the rigid structure 45 to the front pivot 51; (f). a means 33 for removably/detachably securing the front pivot 55 to the front frame member 36 such as a threaded "U"-bolt, bar and a pair of threaded nuts; (g). a power source 80 for energizing the motor 60; (h). a group 86 electrical conductors and connections from the power source 80 to the motor 60; (i). a means 83 to control the power source 80 such as a solenoid 83 and an actuator switch 87 (button on the handlebars); (j). the hydraulic system 40 with a front end and a rear end, the hydraulic system 40 comprised of an extendable actuator tube 42, a cylinder, exterior casing, pressure source, connectors, etc.; (k). a means 50 for removably and pivotally securing the front end of the hydraulic system 40 to the rigid structure 45; (l). a means 55 for removably and pivotally securing the rear end of the hydraulic system 40 to the rear frame 34, 35 of the motor cycle 31, the means further comprised essentially of a removable fastener 55A, a vertical tube 37 with an upper and lower end, a means (pivot 53 and pin 55A) to pivotally connect top end of tube 37 to hydraulic system 40, and a means 39 (such as a threaded "U"-bolt, bar and a pair of threaded nuts) to securely connect the lower end of tube 37 to lower auxiliary motorcycle frame 35; (m). a power source 70 for energizing the hydraulic system 40; (n). a group electrical conductors and connections 74A, 74B, 74C, and 74D from the power source 70 to the hydraulic system 40 through a control switch 44; and (o). the control switch 44 (toggle) to open and shut the conductors 74A and 74C (interrupt the power) from the power source 70 to the hydraulic system 40.

FIGS. 8 A through 8 D; FIGS. 9 A through 9 E; FIGS. 10 A through 10 E; and FIGS. 11 A through 11 E are sketches of the open action of the side car and motorcycle reverse assist mechanism. FIGS. 8 through 11 are sketches of the open action of the side car and motorcycle reverse assist mechanism. FIGS. 8 A through 8 D show a reverse mechanism for a sidecar on a motorcycle to assist and make the assembly go backwards (or both). FIG. 8 A shows a motorcycle 31, sidecar 32 and prototype 90 of reverse mechanism for a sidecar on a motorcycle to assist and make the assembly go backwards (or as an alternative forward or both). FIG. 8 B motorcycle 31, sidecar 32, the prototype 90 of reverse mechanism for a sidecar on a motorcycle to assist and make the assembly go backwards (or as an alternative forward or both), the drive wheel 46, and the neutral free wheel lever 49 e.g. a safety lever to make free wheeling. In FIG. 8 C is shown the motorcycle 31, sidecar 32, drive wheel 46, and neutral free wheel lever 49 e.g. a safety lever to make free wheeling. Next, FIG. 8 D demonstrates the sidecar 32 and drive wheel 46.

The next three sets of sketches demonstrate the operational steps of the reverse mechanism device 30 for a motorcycle with a sidecar.

| Step | Action and reference figure |
|---|---|
| 1 | Flip button - FIG. 9 A |
| 2 | Actuator arm extends - FIG. 9 B |
| 3 | Wheel goes down, touches - FIG. 9 C |

-continued

| Step | Action and reference figure |
|------|------------------------------|
| 4 | Wheel lifts the sidecar up - FIG. 9 D |
| 5 | When raise to top, shut it off - FIG. 9 E |
| 6 | Reach and push motor button - FIG. 10 A |
| 7 | Push motor button it goes back - FIG. 10 B |
| 8 | Un-push motor button it stops - FIG. 10 C |
| 9 | Flip it back up - FIG. 10 D |
| 10 | Raises actuator arm back up Out of way so it does not touch the ground going forward - FIG. 10 E |
| 11 | Once the wheel is up, this is the safety device - FIG. 11 A |
| 12 | The safety device can be pushed down with your foot - FIG. 11 B |
| 13 | Makes the wheel roll free-wheeling in case you touch the ground or crown of road - FIG. 11 C |
| 14 | Free tire skips right across the surface - FIG. 11 D |
| 15 | Then pull the safety lever device up and the actuator and wheel re-engage ready for use - FIG. 11 E |

FIGS. 9 A through 9 E show the steps from the table. FIG. 9 A—Step 9A—Operator/driver 61 of motorcycle 31 flips button or toggle switch 44 to reverse battery polarity—actuator extension button (at tube structure 37). FIG. 9 B—Step 9B—Actuator arm extends the hydraulic actuator tube 42 and lowers the drive wheel 46. FIG. 9 C—Step 9 C Operator/driver 61 of motorcycle 31 shows the hydraulic actuator tube 42 extends and the drive wheel 46 goes down and touches the surface below. In FIG. 9 D—Step 9 D—Wheel lifts the sidecar up when the hydraulic actuator tube 42 extends and lowers the drive wheel 46. Shown also are the sidecar 32, the toggle switch 44 to reverse battery polarity—actuator extension button (at tube structure 37), and the hand of the operator/driver 61 of motorcycle 31. In FIG. 9 F—Step 9F—shows that when the tube is extended and the wheel lowered, then the operator/driver 61 of motorcycle 31 shuts off the toggle switch 44 and the wheel 46 is ready for operation.

FIGS. 10 A through 10 E show the next few steps of operation. FIG. 10 A—Step 10A—Reach and push motor button 87. The operator/driver 61 of motorcycle 31 reaches the push button 87 on motorcycle 31 handle bars to energizes the auxiliary power source 80 (See FIG. 7). FIG. 10 B Step 10B—Push motor button it goes back. The operator/driver 61 of motorcycle 31 and sidecar 32 pushes the button 87 and the motorcycle and sidecar starts backward. FIG. 10 C Step 10C—Un-push motor button 87. The operator 61 releases or un-pushes the button 87 and the motorcycle 31 stops. FIG. 10 D Step 10D—Flip toggle back up. Operator 61 flips toggle switch 44 to reverse battery polarity—actuator extension button (at tube structure 37). FIG. 10 E Step 10E—Raises actuator arm back up Out of way so wheel 46 does not touch the ground going forward. The hydraulic actuator tube 42 retracts and the drive wheel 46 raises.

FIGS. 11 A through 11 E show the final safety steps for use of the reverse mechanism device 30 for a motorcycle with a sidecar. FIG. 11 A—Step 11A—Once the wheel 46 is up, this is the safety device. Once the wheel 46 is raised and in the uppermost position, the neutral free wheel lever 49 (e.g. a safety lever to make free wheeling) is engaged to open the mechanical drive means—a means (not shown, but intuitively obvious for those skilled in motor and gearbox drive mechanisms) for mechanically interconnecting the motor 60, gearbox 60A, means 49 for freewheeling, and wheel 46 such that when the motor 60 revolves, the gearbox 60A is mechanically rotated by the motor 60, then the gearbox 60A rotates through the freewheeling means 49, and then in turn rotates the auxiliary wheel 46 in the subassembly 66. Once the mechanical means is open, the wheel 46 turns freely. FIG. 11 B—Step 11B—The safety device can be pushed down with your foot—The neutral free wheel lever 49 (e.g. a safety lever to make free wheeling) is engaged (opens the mechanical means) when the operator/driver 61 of motorcycle 31 pushes it 49 forward with the foot of the operator 61. FIG. 11 C—Step 11C—Makes the wheel 46 roll free-wheeling in case it 46 touches the ground or crown of road. The neutral free wheel lever 49 e.g. a safety lever to make free wheeling the drive wheel 46 once the operator/driver 61 of motorcycle 31 presses the lever 49. FIG. 11 D—Step 11D—Free wheel/tire 49 skips right across the surface as shown by the operator/driver 61. FIG. 11 E—Step 11E—Then pull the safety lever device 49 up and the actuator and wheel 46 re-engages and is ready for use. Once ready to use the reverse mechanism device 30 for a motorcycle with a sidecar, the operator/driver 61 of motorcycle 31 merely pulls up the neutral free wheel lever 49 e.g. a safety lever to make it reengage the drive subassembly 66 by engaging the mechanical means such that the motor 60, gearbox 60A, means 49 for freewheeling, and wheel 46 are reconnected such that when the motor 60 revolves, the gearbox 60A is mechanically rotated by the motor 60, then the gearbox 60A rotates through the freewheeling means 49, and then in turn rotates the auxiliary wheel 46.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described. All patents and publications mentioned herein, including those cited in the Background of the application, are hereby incorporated by reference to disclose and described the methods and/or materials in connection with which the publications are cited.

The publications discussed herein are provided solely for their disclosure prior to the filing date of the present application. Nothing herein is to be construed as an admission that the present inventions are not entitled to antedate such publication by virtue of prior invention. Further, the dates of publication provided may be different from the actual publication dates which may need to be independently confirmed.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y).

In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

The present disclosure includes that contained in the appended claims, as well as that of the foregoing description. Although this invention has been described in its preferred form with a certain degrees of particularity, it is understood that the present disclosure of the preferred form has been made only by way of example and that numerous changes in the details of construction and the combination and arrangements of parts may be resorted to without departing from the spirit of the invention.

With this description it is to be understood that the reverse mechanism for a motorcycle with a sidecar device 30 is not to be limited to only the disclosed embodiment of product. The features of the device 30 are intended to cover various modifications and equivalent arrangements included within the spirit and scope of the description.

Now that the invention has been described:

What is claimed is:

1. A reverse mechanism (30) for a motorcycle (31) and a sidecar (32) made of durable materials, wherein said motorcycle further comprises a set of a front main frame (36), an upper rear main frame (34) and a lower auxiliary rear frame (35) of connecting frame members, the mechanism comprised of:
   (a). a rigid structure for supporting (45) a drive system with a front end and a rear end, made of durable materials, to support a sub assembly, the rigid structure (45) comprised of a front end pivot (51) at the front main frame (36) of the motorcycle (31) and a rear end pivot (52) fixed to a gearbox (40);
   (b). the sub assembly comprised of a motor (60), the gearbox (60A), a free wheel lever (49), and an auxiliary wheel assembly (46);
   (c). a mechanical interconnection of the motor (60), the gearbox (60A), the free wheel lever (49), and the wheel (46) such that when the motor (60) revolves, the gearbox (60A) is mechanically rotated by the motor (60), then the gearbox (60A) rotates through the free wheel lever (49), and then in turn rotates the auxiliary wheel (46);
   (d). a set of threaded fasteners for removably connecting the sub assembly to the rigid support structure;
   (e). a mechanical fastener means (54) for pivotally and removably/detachably securing the rigid structure (45) to the front pivot (51);
   (f). a mechanical fastener (33) for removably/detachably securing the front pivot (51) to the front frame member (36);

(g). a power source (80) for energizing the motor (60);
(h). a group (86) of electrical conductors and connections from the power source (80) to the motor (60) and an actuator switch (87);
(i). a solenoid (83) and the actuator switch (87) control the power source (80);
(j). a hydraulic system (40) with a front end and a rear end, the hydraulic system (40) further comprised of an extendable actuator tube (42), a cylinder, an exterior casing, a pressure source, and connectors;
(k). a pivot structure (50) for removably and pivotally securing the front end of the hydraulic system (40) to the rigid structure (45) via the gearbox;
(l). an assembly for removably and pivotally securing the rear end of the hydraulic system (40) to the rear main frame member and the lower auxiliary rear frame (34, 35) of the motor cycle (31), the assembly comprising a removable fastener (55A), a vertical tube (37) with an upper and lower end, wherein a pivot (53) and the removable fastener 55A to pivotally connect top end of the tube (37) to the hydraulic system (40), and a threaded "U"-bolt, bar and a pair of threaded nuts to securely and detachably connect the lower end of the vertical tube (37) to a lower auxiliary motorcycle frame (35);
(m). a power source (70) for energizing the hydraulic system (40);
(n). a group electrical conductors and connections (74A, 74B, 74C, and 74D) from the power source for energizing the hydraulic system (70) to the hydraulic system (40) through a toggle switch (44); and
(o). a toggle switch (44) to open and shut the conductors (74A and 74C) to interrupt the power from the power source for energizing the hydraulic system (70) to the hydraulic system (40).

2. The device of claim 1 wherein the mechanical fastener means (33) for removably/detachably securing the front pivot (51) to the front frame member (36) is a threaded "U"-bolt, bar and a pair of threaded nuts.

3. The device of claim 1 wherein the durable material is selected from the group consisting of a metal, a heavy duty, durable simple resin plastic, durable reinforced plastic and composite material.

4. The device of claim 1 wherein the mechanical fastener means (54) for pivotally and removably/detachably securing the rigid structure (45) to the front pivot (51) is selected from the group consisting of a combination nut and bolt and a combination cotter pin and key.

5. The device of claim 1 wherein the mechanical fastener (33) for removably/detachably securing the front pivot (51) to the front frame member (36) is selected from the group consisting of a combination U clip and pin; combination nut and bolt; and a combination cotter pin and key.

6. The device of claim 1 wherein the pivot structure (50) for removably and pivotally securing the front end of the hydraulic system (40) to the rigid structure (45) via the gearbox is selected from the group consisting of a combination nut and bolt; and a combination cotter pin and key.

* * * * *